United States Patent
Liu

(10) Patent No.: US 9,545,700 B2
(45) Date of Patent: Jan. 17, 2017

(54) BALANCING MECHANISM OF MACHINE TOOL TURRET

(71) Applicant: TAIWAN TAKISAWA TECHNOLOGY CO., LTD., Taoyuan County (TW)

(72) Inventor: Chun-I Liu, Taoyuan County (TW)

(73) Assignee: TAIWAN TAKISAWA TECHNOLOGY CO., LTD., Taoyuan County (TW)

( * ) Notice: Subject to any disclaimer, the term of this patent is extended or adjusted under 35 U.S.C. 154(b) by 11 days.

(21) Appl. No.: 14/804,672

(22) Filed: Jul. 21, 2015

(65) Prior Publication Data
US 2016/0184902 A1 Jun. 30, 2016

(30) Foreign Application Priority Data
Dec. 30, 2014 (TW) .............................. 103223308 U

(51) Int. Cl.
*B23B 29/00* (2006.01)
*B23Q 11/00* (2006.01)

(52) U.S. Cl.
CPC ......... *B23Q 11/0025* (2013.01); *B23Q 11/001* (2013.01); *B23Q 2220/002* (2013.01)

(58) Field of Classification Search
CPC ...... B23B 29/32; B23B 29/323; B23B 29/326; B23B 2250/04; B23B 2250/00; B23B 2250/16; B23Q 11/001; B23Q 11/0017
See application file for complete search history.

(56) References Cited

U.S. PATENT DOCUMENTS

| | | | | |
|---|---|---|---|---|
| 2,492,092 A | * | 12/1949 | Bulliet .................... | B23B 41/00 29/6.01 |
| 2,759,378 A | * | 8/1956 | Youssoufian ...... | B23Q 11/0028 137/263 |
| 2,959,191 A | * | 11/1960 | Schuman ............... | B23Q 35/18 137/625.61 |
| 3,137,104 A | * | 6/1964 | Banko ...................... | B23Q 1/74 451/1 |
| 3,327,571 A | * | 6/1967 | Sawada ................ | B23Q 11/001 408/235 |
| 3,458,924 A | * | 8/1969 | Newton ............. | B23Q 3/15526 483/43 |

(Continued)

*Primary Examiner* — Will Fridie, Jr.
(74) *Attorney, Agent, or Firm* — WPAT, PC; Justin King

(57) ABSTRACT

A balancing mechanism of a machine tool turret includes an accommodation housing and a balancing device. The accommodation housing includes a slide rail located at a side of the accommodation housing, a groove located at an opposing side thereof and connected with the machine tool, a driving screw located in the slide rail along a specific axis, a driving motor located top of the accommodation housing and connected with the driving screw, and a block base located in the slide rail and connected with one end of the driving screw. The balancing device is located aside to the accommodation housing with one end fixedly connected with a top side of the accommodation housing and another end extended along the specific axis perpendicular to an axis of a work piece. In a finite installation space, the balancing mechanism has the way in embedding the accommodation housing without increasing the extra volume.

6 Claims, 4 Drawing Sheets

(56) References Cited

U.S. PATENT DOCUMENTS

| | | | | |
|---|---|---|---|---|
| 3,606,701 A | * | 9/1971 | Favot et al. | B24B 27/0666 451/231 |
| 3,707,295 A | * | 12/1972 | Vennin | B23B 31/16216 279/119 |
| 2003/0024309 A1 | * | 2/2003 | Loetzner | G01M 1/32 73/462 |
| 2004/0115017 A1 | * | 6/2004 | Trionfetti | G01M 1/36 409/141 |

* cited by examiner

BALANCING MECHANISM OF MACHINE TOOL TURRET

This application claims the benefit of Taiwan Patent Application Serial No. 103223308, filed Dec. 30, 2014, the subject matter of which is incorporated herein by reference.

BACKGROUND OF INVENTION

1. FIELD OF THE INVENTION

The invention relates to a balancing mechanism, and more particularly to the balancing mechanism that is embedded on a saddle of a machine tool.

2. DESCRIPTION OF THE PRIOR ART

The conventional lathe is a specific machine tool for machining a cylindrical or a round-cross-section work piece. To meet various machining tasks upon the cylindrical work piece, a pneumatic cylinder or a hydraulic cylinder is usually mounted top to a turret at a place between the turret and a saddle of the lathe. Through forcing from the pneumatic or hydraulic cylinder to pull directly the turret at a top thereof so as to match the up-and-down movement of the work piece, the weight of the turret can thus be balanced.

The aforesaid pneumatic or hydraulic cylinder is to provide a cushion device for the lathe. In the art, the like cushion device can be mechanical, pneumatic and hydraulic. The mechanical cushion device is mainly consisted of springs with specific resilience against the elastic deformation of the aforesaid suspended combination (the protrusive spindle and the work piece). The hydraulic cushion device is to provide the internal hydraulic oil as a damping matter to buffer the forcing from the suspended combination. The pneumatic cushion device is to provide the internal air as a compressive matter so as thereby to provide damping to reduce the possible impact from the suspended combination.

Nevertheless, to meet various machining patterns of the lathe upon prospective work pieces, the aforesaid cushion device would face a need of extended displacement range. For the cushion device is usually mounted to the top of the bed, i.e. at the almost highest point of the lathe, thus an installation room problem would be induced to contain the movable cushion device at the already high-enough top of the bed. To make worse, the space in a factory for installing the machine tool is usually limited.

Hence, in order to overcome all the aforesaid shortcomings of the conventional structures, an improved cushion device for compensating the deformation of the spindle is definitely welcome to the industry of the machine tools.

SUMMARY OF THE INVENTION

Accordingly, it is the primary object of the present invention to provide a balancing mechanism of a machine tool turret, in which the balancing mechanism is embedded on the machine tool without substantially increasing installation volume of the machine tool. Namely, in consideration the finite installation space, the balancing mechanism has the way in embedding an accommodation housing without increasing the extra volume.

In the present invention, the balancing mechanism includes the accommodation housing and a balancing device.

The accommodation housing further includes a slide rail located at a lateral side of the accommodation housing, a groove located at an opposing lateral side thereof and connected with the machine tool, a driving screw located in the slide rail and extended along a specific axis, a driving motor located at a top side of the accommodation housing and connected with the driving screw, and a block base located in the slide rail and connected with one end of the driving screw that is away from the driving motor.

The balancing device is located aside to the accommodation housing by neighboring the driving screw. One end of the balancing device is fixedly connected to a top side of the accommodation housing, while another end thereof is extended along the specific axis, in which the specific axis is defined to be perpendicular to a main axial direction of a work piece.

By providing the balancing mechanism in a form of an embedded balancing cylinder in accordance with the present invention, the installation volume for the whole machine tool would be kept the same, such that the aforesaid space limitation problem (especially in height) met by a machine tool equipped with the conventional cushion device would be resolved.

All these objects are achieved by the balancing mechanism of a machine tool turret described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a balancing mechanism of a machine tool turret. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
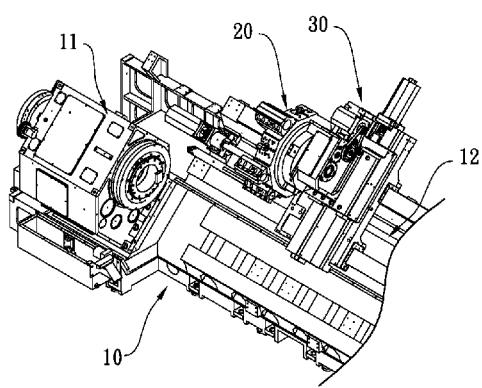
FIG. 1 is a schematic perspective view of a portion of a machine equipped with a balancing mechanism in accordance with the present invention.
Figure 2:
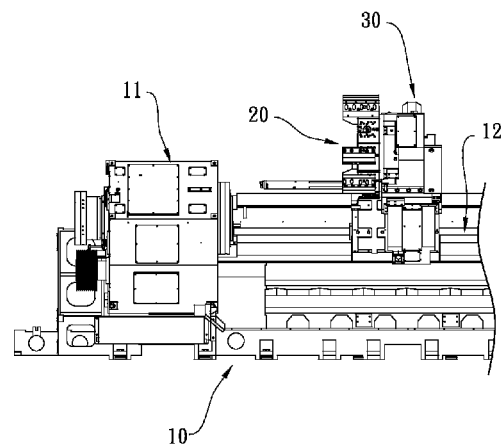
FIG. 2 is a front view of FIG. 1.

Referring now to FIG. 1 and FIG. 2, the preferred balancing mechanism for a machine tool (typically, a lathe) in accordance with the present invention is shown. The machine tool mainly includes a bed 10, a headstock 11 for nesting a spindle, a guideway assembly 12, a turret 20 and a balancing mechanism 30. The balancing mechanism 30 is kinematically coupled with the turret 20. The balancing mechanism 30 can be applied to various types of the machine tools or mechanical equipments for a dynamic compensation purpose. The balancing mechanism 30 is (but not limited to) hydraulically driven in this preferred embodiment of the balancing mechanism. The machine tool as shown herein in the figures is simplified in structuring to present the machine tool at large, and skill person in the art shall understand such an expression would not limit the scope of the present invention.

Figure 3A:
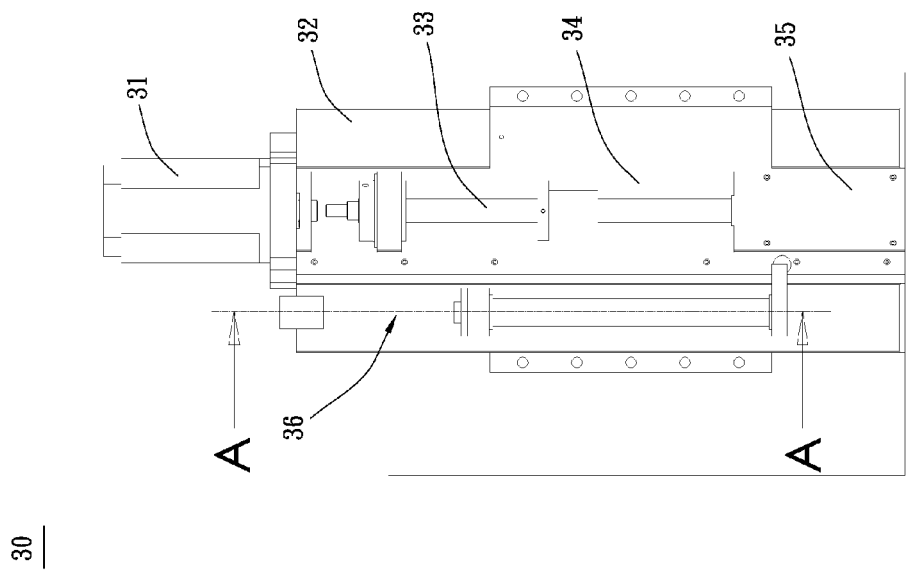
FIG. 3A is a schematic front view of the balancing mechanism of FIG. 1.
Figure 3B:
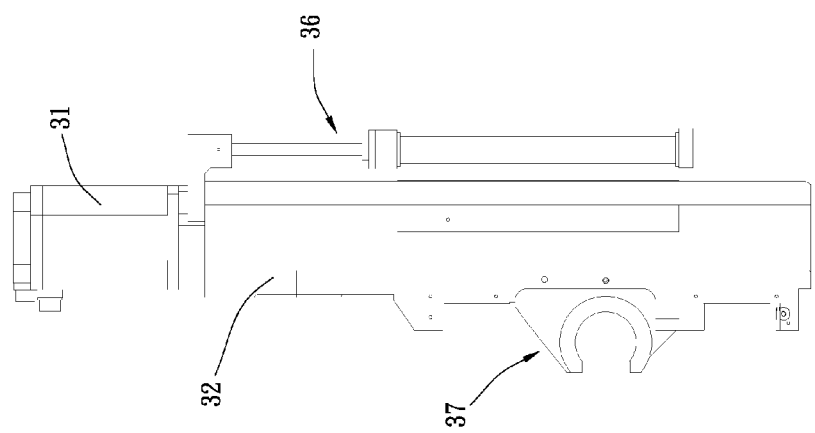
FIG. 3B is a schematic side view of FIG. 3A.

Referring also to FIG. 3A and FIG. 3B, a front view and a side view of the balancing mechanism of FIG. 1 are schematically shown. The balancing mechanism 30 includes a driving motor 31, an accommodation housing 32, a driving screw 33, a slide rail 34, a block base 35, a groove 37 and a balancing device 36. The groove 37 is disposed at the back of the accommodation housing 32 and is connected with the guideway assembly 37 of the machine tool. The guideway assembly 12 includes at least a screw bar for guiding the balancing mechanism 30 to move along in a predetermined horizontal axial direction. The slide rail 34 is disposed at the front side of the accommodation housing 32 so as to mount the driving screw 33 thereinside. One end of the driving screw 33 is connected to the driving motor 31 located on the top side of the accommodation housing 32, while another end of the driving screw 33 is fixedly coupled with the block base 35. The block base 35 fixed to the accommodation housing 32 is located inside the slide rail 34. One side (the top side as shown) of the block base 35 is coupled with the end of the driving screw 33 that is distant from the driving motor 31. The front side of the block base 35 is locked to the turret 20. By having the driving motor to turn the driving screw 33, the turret 20 can displace freely along a specific axis.

As described above, the balancing device 36 is located at the front side of the accommodation housing 32 by neighboring the driving screw 33 and by having one end thereof locked to the top side of the accommodation housing 32, while another end of the balancing device 36 is extended along the specific axis by being parallel to the driving screw 33.

Figure 4:
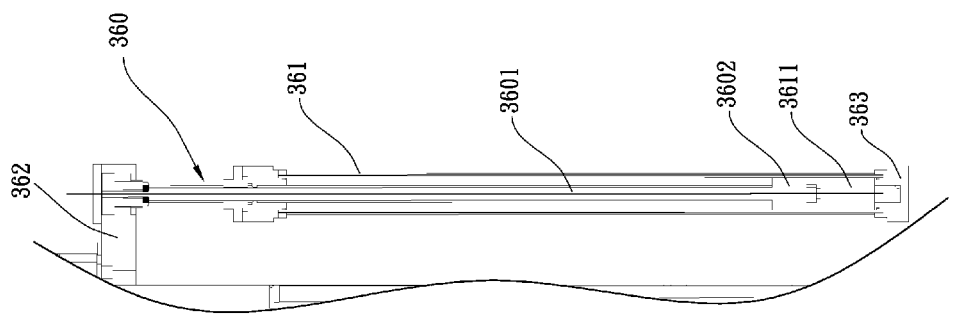
FIG. 4 is a schematic cross sectional view of FIG. 3A along line A-A.

Refer now to FIG. 3A, FIG. 3B and FIG. 4, in which FIG. 4 is a cross sectional view of FIG. 3A along line A-A through the balancing device 36. As shown, the balancing device 36 includes a piston assembly 360, a tank 361, a position block 362 and a connection member 363.

The position block 362 formed as a block member has one end locked to the top side of the accommodation housing 32, while another end thereof is protruded outward from the front side of the accommodation housing 32.

The tank 361 is a lengthy hollow cylinder having holes at two opposing ends thereof and an internal accommodation room 3611 for containing the hydraulic oil. The connection member 363 locked to the end of the tank 361 that is distant to the position block 362 is connected with the turret 20.

The piston assembly 360 further includes a connection bar 3601 and a piston 3602. The piston 3602 is fixed and locked to one end of the connection bar 3601, while another end of the connection bar 3601 is protruded outward through the tank 361 to couple the position block 362. The shape and the size of the piston 3602 of the piston assembly 360 are configured in coherence with the accommodation room 3611. In this embodiment, the piston 3602 is shaped as a disk to have the circumference thereof contacting the wall of the accommodation room 3611 (i.e. inner wall of the tank 3610) so as to allow the piston 3602 to slide inside along the accommodation room 3611.

In the present invention, the predetermined horizontal axial direction is defined to be parallel to the work piece, and the specific axis is defined by being perpendicular to the work piece. In the preferred embodiment, the balancing device 30 is extended along the specific axis so as to approach the block base 35 but being away from the driving motor 31.

In the present invention, the balancing device 36 is mounted between the turret 20 and the accommodation housing 32 in a form of an embedded balancing cylinder. Upon such an arrangement, the finite installation space in a factory can be effectively utilized, the volume shortage for the machine tool to meet various work pieces and various machining tasks described in the background section can be avoided, the loading upon the motor and the driving screw of the balancing cylinder for the spindle can be reduced, and thus the service life of the components can be increased.

While the present invention has been particularly shown and described with reference to a preferred embodiment, it will be understood by those skilled in the art that various changes in form and detail may be without departing from the spirit and scope of the present invention.

What is claimed is:

1. A balancing mechanism, applicable to a machine tool, comprising:
    an accommodation housing, further comprising:
        a slide rail, located at a lateral side of the accommodation housing;
        a groove, located at another lateral side thereof opposing to the lateral side and connected with the machine tool;
        a driving screw, located in the slide rail and extended along a specific axis;
        a driving motor, located at a top side of the accommodation housing and connected with the driving screw; and
        a block base, located in the slide rail and connected with one end of the driving screw that is away from the driving motor; and
    a balancing device, located aside to the accommodation housing by neighboring the driving screw, one end of the balancing device being fixedly connected to the top side of the accommodation housing with another end thereof being extended along the specific axis;
    wherein the specific axis is defined to be perpendicular to a main axial direction of a work piece.

2. The balancing mechanism of claim 1, wherein the balancing device further includes:
    a position block, formed as a block member, having one end thereof locked to the top side of the accommodation housing, while another end thereof is protruded outward from a side of the accommodation housing;
    a tank, formed as a lengthy hollow cylinder having holes at two opposing ends thereof and an internal accommodation room;
    a piston assembly, having a connection bar and a piston, the piston being fixed and locked to one end of the connection bar, while another end of the connection bar is protruded outward through the tank to couple the position block;
    a connection member, fixedly connected with an end of the tank distant from the position block.

3. The balancing mechanism of claim 1, wherein the machine tool has a bed, a turret and a guideway assembly, and the balancing device is mounted between the turret and the accommodation housing.

4. The balancing mechanism of claim 3, wherein the specific axis is a direction approaching the block base but being away the driving motor.

5. The balancing mechanism of claim 3, wherein the groove is coupled to the guideway assembly, and the guideway assembly includes at least a screw bar for providing the balancing mechanism to displace freely along a predetermined horizontal axial direction.

6. The balancing mechanism of claim 5, wherein the predetermined horizontal axial direction is parallel to the work piece.

* * * * *